(12) United States Patent
Peachey

(10) Patent No.: US 7,548,243 B2
(45) Date of Patent: Jun. 16, 2009

(54) DYNAMIC SCENE DESCRIPTOR METHOD AND APPARATUS

(75) Inventor: Darwyn Peachey, San Rafael, CA (US)

(73) Assignee: Pixar, Emeryville, CA (US)

( * ) Notice: Subject to any disclaimer, the term of this patent is extended or adjusted under 35 U.S.C. 154(b) by 150 days.

(21) Appl. No.: 10/810,487

(22) Filed: Mar. 26, 2004

(65) Prior Publication Data

US 2005/0212803 A1 Sep. 29, 2005

(51) Int. Cl.
*G06T 13/00* (2006.01)
*G06T 15/00* (2006.01)

(52) U.S. Cl. .................. 345/473; 345/420; 345/426; 345/428

(58) Field of Classification Search .................. 345/427
See application file for complete search history.

(56) References Cited

U.S. PATENT DOCUMENTS

| | | | |
|---|---|---|---|
| 5,999,194 A * | 12/1999 | Brunelle | 345/473 |
| 6,058,397 A | 5/2000 | Barrus et al. | |
| 6,232,974 B1 * | 5/2001 | Horvitz et al. | 345/419 |
| 6,278,448 B1 | 8/2001 | Brown et al. | |
| 6,278,466 B1 | 8/2001 | Chen | |
| 6,313,837 B1 * | 11/2001 | Assa et al. | 345/420 |
| 6,348,921 B1 * | 2/2002 | Zhao et al. | 345/428 |
| 6,353,437 B1 * | 3/2002 | Gagne | 345/473 |
| 6,400,372 B1 * | 6/2002 | Gossweiler et al. | 345/619 |
| 6,559,845 B1 * | 5/2003 | Harvill et al. | 345/473 |
| 6,570,578 B1 * | 5/2003 | Smirnov et al. | 345/629 |
| 6,573,898 B1 | 6/2003 | Mathur et al. | |
| 6,985,145 B2 * | 1/2006 | Knighton et al. | 345/428 |
| 7,042,454 B1 * | 5/2006 | Seligman | 345/428 |
| 7,102,639 B2 * | 9/2006 | Oka | 345/428 |
| 2005/0134591 A1 * | 6/2005 | Baxter | 345/473 |

FOREIGN PATENT DOCUMENTS

EP   1191793 A   3/2002

OTHER PUBLICATIONS

Cook et al., The Reyes Image Rendering Architecture, Computer Graphics, vol. 21, No, 4, 1987, pp. 95-102.
Shih-Fu Chang et al., "Overview of the MPEG-7 Standard," IEEE Transactions on Circuits and Systems for Video Technology, IEEE Service Center, Piscataway, NJ, US, vol. 11, No. 6, Jun. 2001, XP011014207 ISSN: 1051-8215.
International Search Report.
Chinese Office Action—Appl. 200480028869.1.

* cited by examiner

*Primary Examiner*—Kee M Tung
*Assistant Examiner*—Andrew Yang
(74) *Attorney, Agent, or Firm*—Townsend and Townsend and Crew LLP

(57) ABSTRACT

A method for rendering a frame of animation includes retrieving scene descriptor data that specifies at least one object, wherein the object is associated with a first database query, wherein the first database query is associated with a first rendering option, receiving a selection of the first rendering option or a second rendering option, querying a database with the first database query and receiving a first representation of the object from a database when the selection is of the first rendering option, loading the first representation of the object into computer memory when the selection is of the first rendering option, and rendering the object for the frame of animation using the first representation of the object when the selection is of the first rendering option, wherein the first representation of the object is not loaded into computer memory when the selection is of the second rendering option.

23 Claims, 6 Drawing Sheets

DYNAMIC SCENE DESCRIPTOR METHOD AND APPARATUS

BACKGROUND OF THE INVENTION

The present invention relates to computer animation. More particularly, the present invention relates to techniques and apparatus for memory and time efficiency in processing complex scenes.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion-based techniques were developed by movie makers such as Willis O'Brein such as "King Kong" (1933). Subsequently, these techniques were refined by the animators such as Ray Harryhausen for movies including "The Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer aided animation (CA) industry was Pixar. Pixar developed both computing platforms specially designed for computer animation and animation software now known as RenderMan®. RenderMan® was particularly well received in the animation industry and recognized with two Academy Awards®. One of these awards recognized the inventor of the present patent application, and others, with a Scientific And Engineering Achievement Award® in 1992.

RenderMan® software is used to convert graphical specifications of objects and convert them into one or more images. This technique is known in the industry as rendering. One specific portion of the rendering process is the graphical specification of objects to be rendered. Objects may refer to geometric objects in the image, lighting objects, camera objects, and the like. In this process, objects may be pre-defined and pre-specified, objects may be defined procedural techniques, objects may be defined by a combination of these techniques, or the like.

Typically scenes to be rendered are specified (assembled) by one or more animators. These scenes include descriptions of the objects, camera angles, lighting sources, and the like. Once a scene is defined, the scene data stored and/or the scene is rendered. The resulting image is then viewed by the animators. If the animators do not like the appearance of the rendered image, the animators re-specify the scene data and the process repeats.

Drawbacks with the above techniques include that there are a great number of objects in a typical scene, each typically having a great number of parameters that can or must be set by the animator. The scene data file (also known as a scene descriptor file) that describes the entire scene is accordingly, typically very large (gigabytes). Because of the sizes of typical scene descriptor files are typically large, the animator's computer must have sufficient amount of memory. As an another drawback, because scene descriptor files are typically large, the animators typically have to wait for the descriptor files to be retried from memory. Additionally, because scene descriptor files are typically large, the animators typically have to wait a long time for the scene to be rendered.

In light of the above, what is needed are improved techniques for animators to specify scenes without the drawbacks described above.

BRIEF SUMMARY OF THE INVENTION

The present invention relates to computer animation. More specifically, the present invention relates to improved methods for specifying scene data for computer animation The inventor of the present invention has recognized that different animators render images of scenes for different purposes. Additionally, the inventor has recognized that when rendering scenes, not all elements of a scene are important to an animator. For example, an animator may be concerned about the positioning or quality of lighting in a scene, such as object color, texture, and shading, accordingly, the animator may not necessarily be concerned about how detailed objects are represented in the scene. As another example, an animator may be concerned with the animation of objects in the scene and not necessarily about lighting or shading of objects in a scene. As still another example, an animator may be concerned with the layout of objects in the scene, and not necessarily how detailed objects appear in the scene. As yet another example, an animator may be concerned with the set dressing in the scene, and not necessarily animation of objects in a scene.

In light of this, the inventor of the present invention has developed methods for organizing scene descriptor files. More specifically, the inventor has developed methods for specifying more than one model of objects, or parameters within a scene descriptor file. The methods described in the present application allow animators to dynamically select a model for an object that is appropriate for the purpose of the animation. In one embodiment, the selected model or selected set of parameters is referenced via pointer to one or more separate files. By selecting only appropriate models, the amount of scene data that is loaded into computer memory is reduced, and the amount of time required for rendering is also typically reduced.

In another embodiment, parameters for models of objects may be specified globally once for an entire feature, however parameters may be overridden for particular sequences in a feature. Additionally, parameters may be overridden for particular shots in a feature, and/or even for particular camera modes, as will be described below.

In some embodiments, selected models or selected set of parameters may be made-up of sub-models or subsets of parameters. This type of recursive decomposition is highly advantageous, as will be discussed below, since it greatly reduces the amount of redundant data used in a scene. In other embodiments, a scene descriptor file may be integrated to operate with database management systems and/or software management systems for accessing model data.

According to one aspect of the invention, a method for rendering a frame of animation is described. Techniques include retrieving scene descriptor data associated with the frame of animation, wherein the scene descriptor data includes a first specification of at least one object, wherein the first specification of the object is associated with a first rendering option, receiving a selection of the first rendering option or a second rendering option, and querying a database for a first representation of the one object in response to the first specification of the object when the selection is of the first rendering option. Other processes may include loading the first representation of the object into computer memory when the selection is of the first rendering option, and rendering the object for the frame of animation using the first representation of the object when the selection is of the first rendering option. The first representation of the object is not loaded into computer memory when the selection is of the second rendering option.

According to another aspect of the invention, a method for rendering a frame of animation is disclosed. Techniques may include retrieving scene descriptor data associated with the frame of animation, wherein the scene descriptor data specifies at least one object, wherein the object is associated with a reference to a first representation of the object, and the object is associated with a reference to a second representation of the object, wherein the first representation of the object is associated with a first rendering option, and the second representation of the object is associated with a second rendering option. Additional techniques may include receiving a selection of the first rendering option or a second rendering option, loading the first representation of the object into computer memory when the selection is of the first rendering option and rendering the object for the frame of animation using the first representation of the object when the selection is of the first rendering option. In various embodiments, the first representation of the object is not loaded into computer memory when the selection is of the second rendering option. Further, the first representation of the object comprises references to representations of a first plurality of objects, and the second representation of the object comprises references to representations of a second plurality of objects. Additionally, at least one object within the first plurality of objects is also within the second plurality of objects.

According to yet another aspect of the invention, a computer program product for a computer system including a processor is described. The computer program product includes code that directs the processor to retrieve scene descriptor data associated with the frame of animation into program memory, wherein the scene descriptor data specifies at least one object, wherein the object is associated with a first representation of the object, wherein the first representation of the object is associated with a first rendering option, wherein the object is associated with a second representation of the object, wherein the second representation of the object is associated with a second rendering option, code that directs the processor to determine a selection of the first rendering option or the second rendering option, code that directs the processor to load the first representation of the object into program memory when the selection is of the first rendering option, and code that directs the processor to rendering the object for the frame of animation in response to the first representation of the object when the selection is of the first rendering option. In various embodiments, the first representation of the object is not loaded into program memory when the selection is of the second rendering option. Additionally, the codes typically reside on a tangible media such as a magnetic disk, an optical disk, a series of data packets, and the like. In various embodiments, the first representation of the object comprises references to representations of a first plurality of objects, and the second representation of the object comprises references to representations of a second plurality of objects. Further, at least one object within the first plurality of objects is also within the second plurality of objects.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
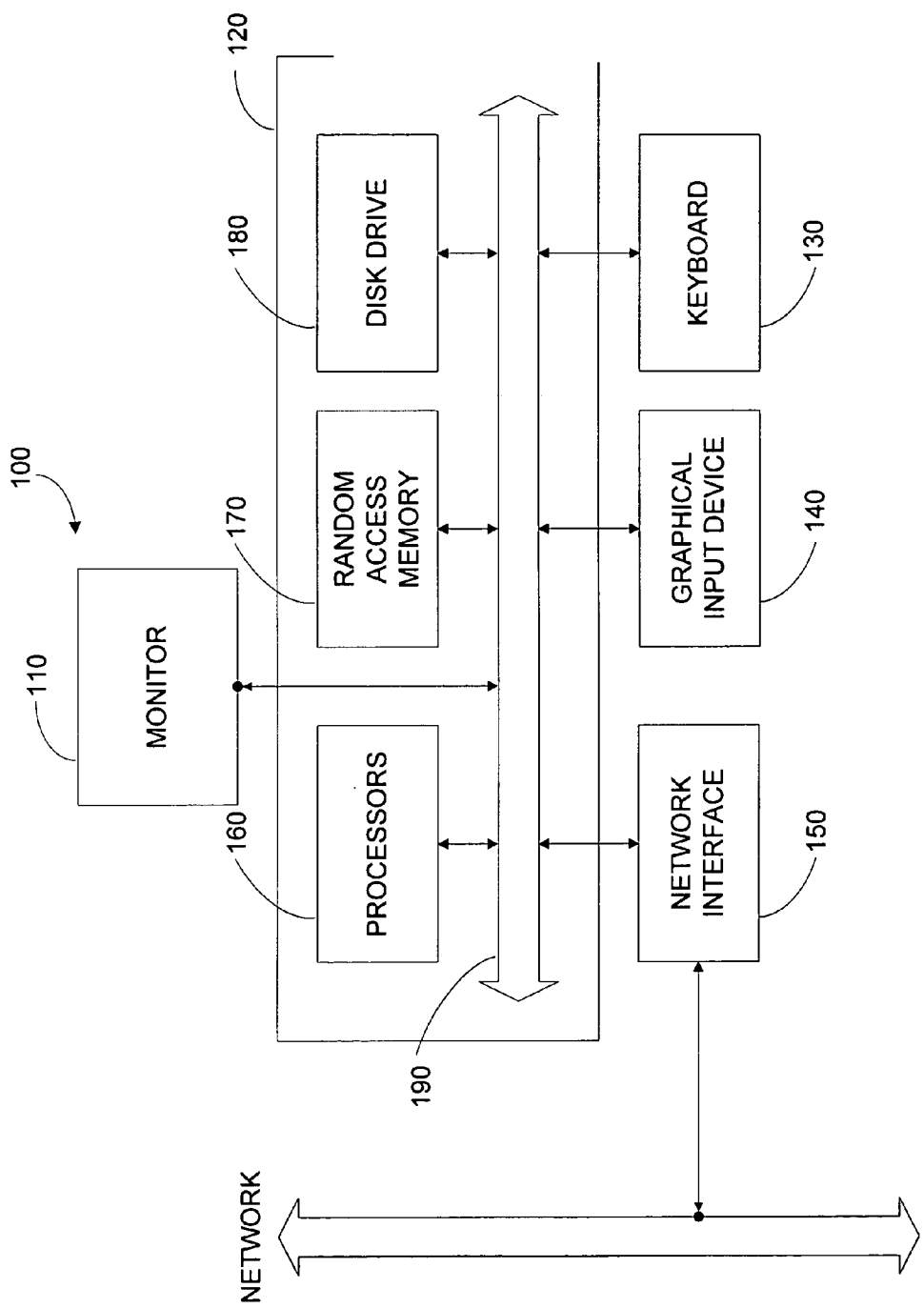
FIG. 1 illustrates a block diagram of a rendering system according to one embodiment of the present invention.

FIG. 1 is a block diagram of typical computer rendering system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of data, audio/video files, computer programs, applet interpreters or compilers, virtual machines, embodiments of the herein described invention including scene descriptors, hook files, object data files, shader descriptors, a rendering engine, output image files, texture maps, displacement maps, scattering lengths and absorption data of object materials, a database and the like. Other types of tangible media include floppy disks, removable hard disks, optical storage media such as CD-ROMS, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer rendering systems capable of embodying the present invention. It will be readily apparent to one of ordinary skill in the art that many other hardware and software configurations are suitable for use with the present invention. For example, the use of other micro processors are contemplated, such as Pentium™ or Itanium™ microprocessors; Opteron™ or AthlonXP™ microprocessors from Advanced Micro Devices, Inc; PowerPC G3™, G4™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 2A:
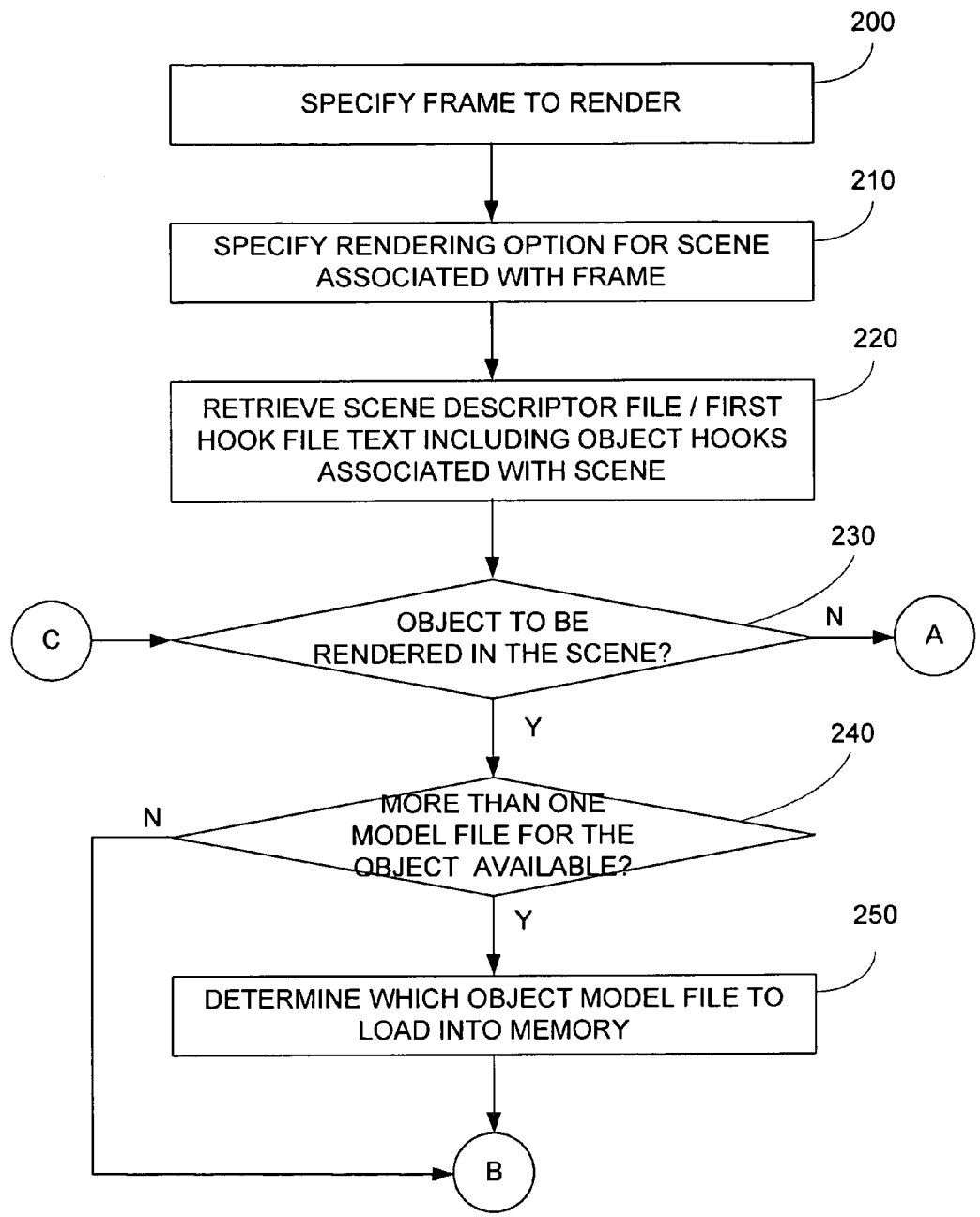
FIGS. 2A-B illustrate a block diagram of a flow process according to an embodiment of the present invention.
Figure 2B:
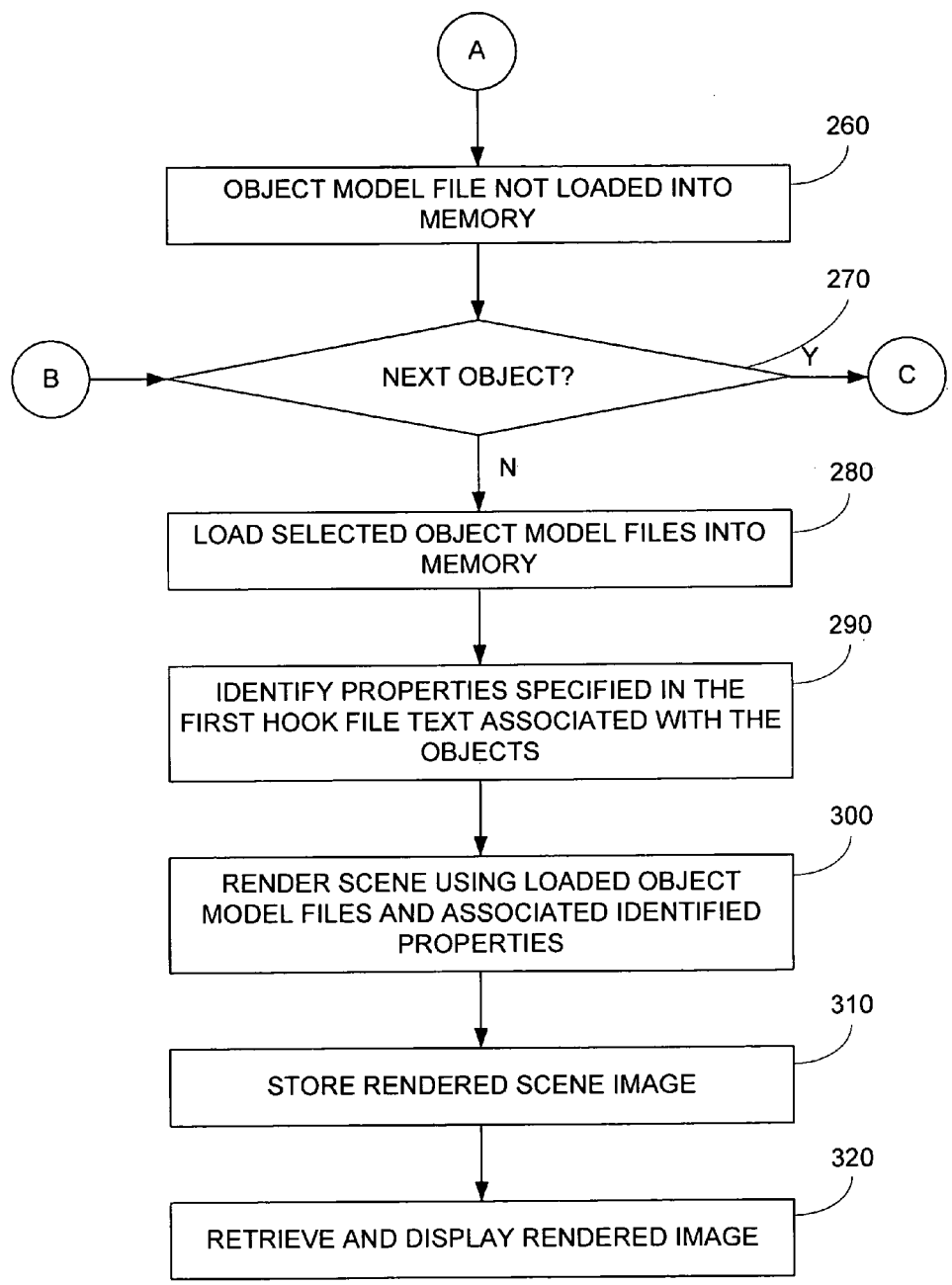

FIGS. 2A-B illustrate a block diagram of a process flow according to an embodiment of the present invention. In the embodiment illustrated, initially an frame is specified for rendering, step 200. In embodiments of the present invention, the specification may be a specific frame, a set of related frames (a shot), a portion of a movie, an entire movie, or the like. The specification may be made via selection of an identifier, such as a name, number and the like.

Next, a rendering option is specified, step 210. In one embodiments of the present invention, the rendering option may be a specification of a rendering quality, a rendering purpose, an animation task, or the like. As discussed above, an image may be rendered for a number of reasons including determining if the lighting is aesthetically pleasing, determining the colors or textures match, reviewing the visual arrangement or composition of the scene, for a final rendering, as well as other reasons. Accordingly, the rendering option may correspond with a reason the image is being rendered. In other embodiments, the rendering option may indicate particular objects to be included or excluded from a rendered scene, may indicate particular lights to be included or excluded from a rendered scene, may indicate particular cameras to use to render the scene, and the like.

In the present embodiment, a frame is associated with a geometric scene descriptor. This geometric scene descriptor is typically a text file that specifies "objects" within the scene. Objects include lighting objects, camera objects, geometric objects, and the like. These objects are used to specify the scene for rendering purposes. As will be described further below, the different objects are described using different representations, and the different objects typically include different properties including: settings, parameters, constants, attributes, and application data or the like.

In the present embodiment, the scene descriptor file also specifies the position of objects in the scene, the orientation of objects, the colors and textures for the objects, properties for objects, and the like. In the present invention, the scene descriptor file is a textual file referred to as a "hook set" or "hook file." An example of the content of a simple hook file may include the following:

hook "object1" {properties of object 1}
hook "camera1" {properties of camera 1)
hook "light1" {properties of light 1}

In the present embodiment, a scene descriptor file specifying the scene to be rendered is retrieved from memory, step 220. In one embodiment, the scene descriptor file may be associated with only the frame to be rendered, may be associated with a shot of images, may be associated with a portion of a feature, or may be associated with the entire feature, or the like.

In the present embodiment, properties of objects may be used to specify the values for the object. In one embodiment, for a camera object, properties may include: type of projection (e.g. perspective); field of view; width; position; azimuth; pitch, pan, and roll; aspect ratio; focusing option; cropping; shifting; tv aspect ratio, pan and scan option, number of tracks, number of cranes, and the like.

An example of a camera hook is as follows:

```
hook "main_cam" {
    desc = main_cam: Nemo production camera, aka camera01a;
    kind = camera;
    filename = stdobj/Camera01a.m;        (filename of camera model)
    importance = 1;
    autoload = 1;
    active = 1;
    macro = do_Camera01a(name);
    exportvecs = XF CanVec;
    importvecs = ;
    hasSNSAvars = 0;
    mcat_name = main_cam;
    param {                                (parameters)
        projection = "perspective";
        defFov = 45;
        defWidth = 1;
    defCamX = 0;
    defCamy = 0;
    defCamz = 0;
    defAzimuth = 0;
    defPitch = 0;
    defPan = 0;
    defRoll = 0;
    defNear = 20;
    defFar = 200000;
    defAspect = 1.85;
    focusing = "on";
    cropping = "off";
    shifting = "off";
    panScan = "off";
    tvAspect = 1.33;
    NumTracks = 2;
    NumCranes = 2;
    CameraHeadExtraAvars = 1;
    doCamMod = 0;
    camModFunc = NULL;
    camModFuncParams = Null;
    name = "main_cam";
}
```

In another embodiment, for a light object, properties may include: light quality, light type, light shape, light color, and the like. Not all camera objects or light objects need to support the same properties. For example, an "atmospheric fog light" may have a unique fog properties. An example of a light hook is as follows:

```
hook "LP_Lspt_onPodium" {
    use "stdlight/glight01a/glight01a.hook";
    kind = light;
    class = _Clsss_Glight01a;
```

-continued

```
    macro = glight01a(name);
    filename = stdlight/glight01a/glight01a.m;  (filename of light model)
    exportvecs = ToPointXf FromPoingSf;
    parent = set_lights;
    depends_on = ;
    importvecs = RimObjMat CamMat IntMult ToPointAttachMat
FromPointAttachmat;
    cues = messhall_prlim_lights.cue;
    param {                                        (parameters)
        name = "LP_Lspt_onPodium:;
        lightQuality = L_FULL;
        lightSource = L_SPOT;
        defIllum = 1'
        lightShape = L_Barn;
        lcolor = (0.948905, 1.0, 0.889);
        numGlobalBlockers = 0;
        numGlobalRods = 0;
        numGlobalFakes = 0;
        numGlobalSoftners = 0;
        numGlobalCookies = 0;
        numGlobalBarns = 0;
        shadowmaps = shaderargs ("LP_Lkey_fromHole_sm");
    }
    appl {                                         (application data)
        glightType = glight01a;
        lightName = LP_Lspt_onPodium
        lightRed = 0.948905;
        lightBlue = 0.889;
        lightGreen = 1.0;
        lightColor = ;
        shmapsUsed = LP_Lkey_fromHole_sm;
}}
```

In embodiments of the present invention, geometric objects may include virtually any imaginable properties supported. For example, one geometric parameter may be: number of legs for a chair object; number of eyeballs for a monster object, etc. As an example, a hook entry may resemble the following:

hook "object1" param {number_of_heads=2}

In the present embodiment, for objects to be rendered in the scene, multiple rendering options or quality selections may be made for the objects. As an example, an object may have a "full" or fully specified model, the object may have a "stand-in" or less-than fully specified model, and the like. In one embodiment of the present invention, all objects in a scene may have models corresponding each quality selection. For example, object A and object B may both have "full" models and "stand-in" models. In other embodiments, not all objects in a scene will not have the same selections of models. For example, object A may have "full" and "stand-in" models, while object B may simply have one model. In such an example, that model may be the "full" model. In still other examples, objects may have models that are specific only to itself. For example, a lighting object may have a "soft" model, a "hard" model, or the like. In other embodiments, a greater number or lesser number of rendering options (e.g. rendering quality options) are contemplated. For example, referring to the example above, the hook file for object1 may be include the following:

```
    hook "object1"  {full_model = "object1_full.mdl";
                    number_of_legs = 4;
                    standin_model = "object1_standin.mdl";
                    number_of_legs = 1; ....}
```

As can be seen in this example, object1 includes filename references to two different model descriptor files (e.g. *.mdl files). In the present embodiment, each model descriptor file is an industry standard mdl file that specifies how object1 is to be rendered in the scene. Further, the mdl files typically store pre-defined geometric components, textures, colors, or the like associated with object1. In other embodiments, the model descriptor files may include procedurally generated geometric components, procedurally generated textures, and the like for object 1. In still other embodiments, combinations of both pre-defined and procedurally generated aspects of object 1 may be used.

As a simple illustration, an object such as Mike Wazowski™ in the 2001 animated feature, Monsters, Incorporated™ may be specified for a scene using the above techniques. For example, a full model and a stand-in model may be included in a scene descriptor file. For final rendering purposes, the full model of Mike Wazowski, having two legs, may be retrieved and used to render the scene. However, for lighting purposes, the stand-in model of Mike Wazowski having only a single leg, may retrieved and used to render the scene. Because not all objects need to be rendered in a scene, not all objects need to be retrieved into memory.

Referring to the embodiment in FIG. 2A, for a first object specified in the scene descriptor file, a determination is made as to whether it should be retrieved into memory and rendered in the scene, step 230. This determination is typically made in response to the rendering options selected. As an example a rendering may be for set dressing purposes to see how the background objects in a scene appear. In such a case, a foreground object (e.g. a character) may not be rendered.

In the present embodiment, if the object is to be included in the rendering of a scene, the object may also have more than one model file associated with it, step 240. As illustrated in the example above, a model may have a "full" model and a "stand-in" model. If there is more than one model, a determination is made as to which model to use for rendering purposes, typically in response to the rendering options selected, step 250. A "default" model may be determined in some embodiments, unless overridden by the rendering option. In the embodiment where only model is specified, that model may be automatically selected.

In the present embodiment, if the object is not required, the model will not be used for rendering purposes, step 260. More specifically, the model will not be loaded into memory. The process then repeats for the next object (hook) in the scene descriptor file, step 270, typically until all hooks have been considered.

In one embodiment, the objects that are selected for rendering are then loaded into memory, step 280. For example, for geometric objects, the .mdl files are retrieved; for camera objects, .m files are retrieved. In other embodiments, the objects may be loaded one at a time, when the object is determined to be required in the rendering.

Next, the properties (e.g. parameters, constants, attributes, and application data) specified in the hook file, and associated with each of the loaded objects are applied to the objects, step 290. In other embodiments, the objects are called using the properties specified, and in step 280, an instantiated object is returned.

In the present embodiment, the scene is then rendered using the loaded objects and properties specified in the hook file, step 300. It should be understood that rendering in this step may or may not be a formal high-quality rendering process. The resulting image of the scene may be stored in a computer memory, film media, or the like, step 310, then subsequently retrieved and displayed, step 320.

Figure 3A:
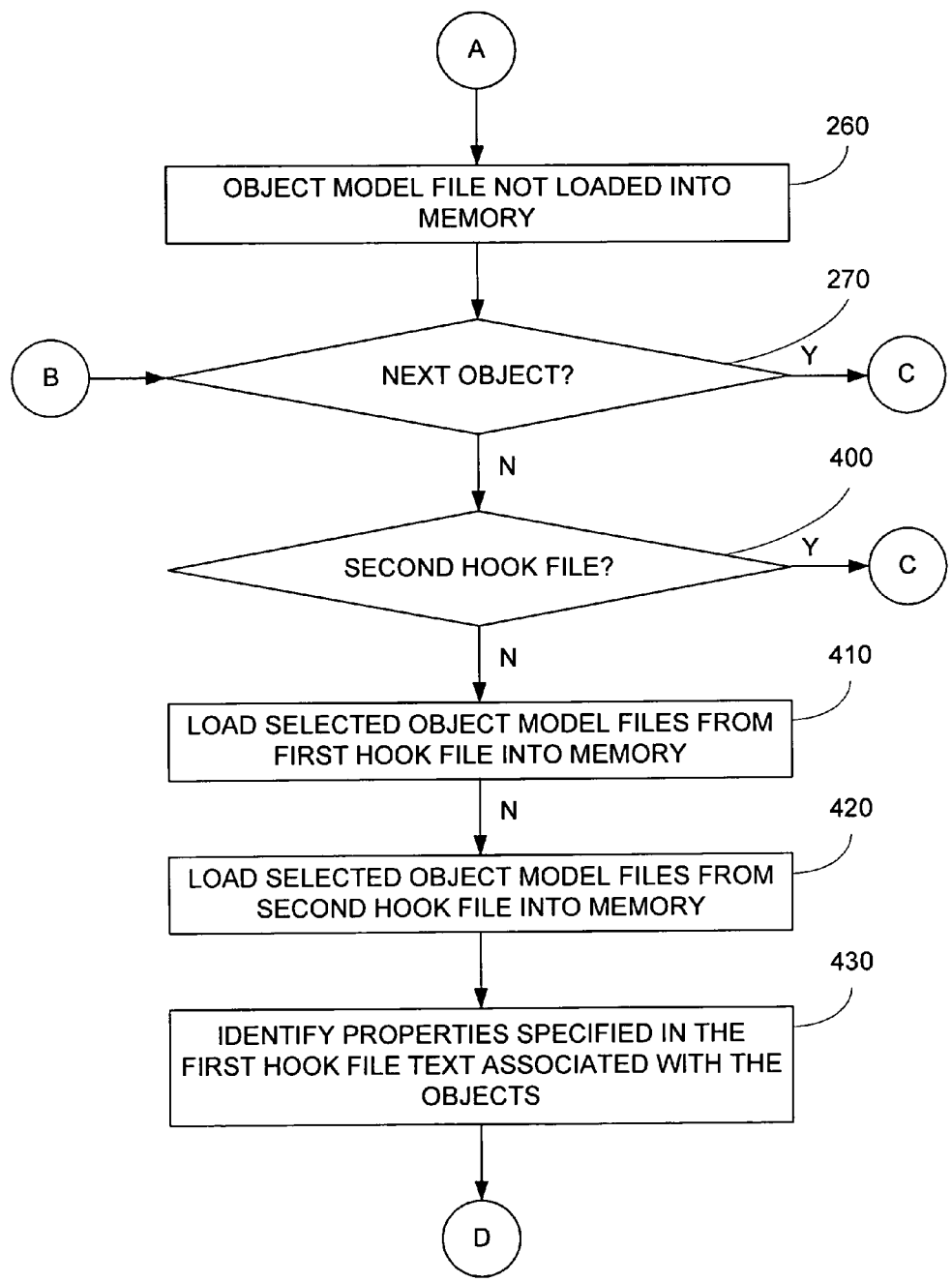
FIGS. 3A-B illustrate an example of an embodiment of the present invention.
Figure 3B:
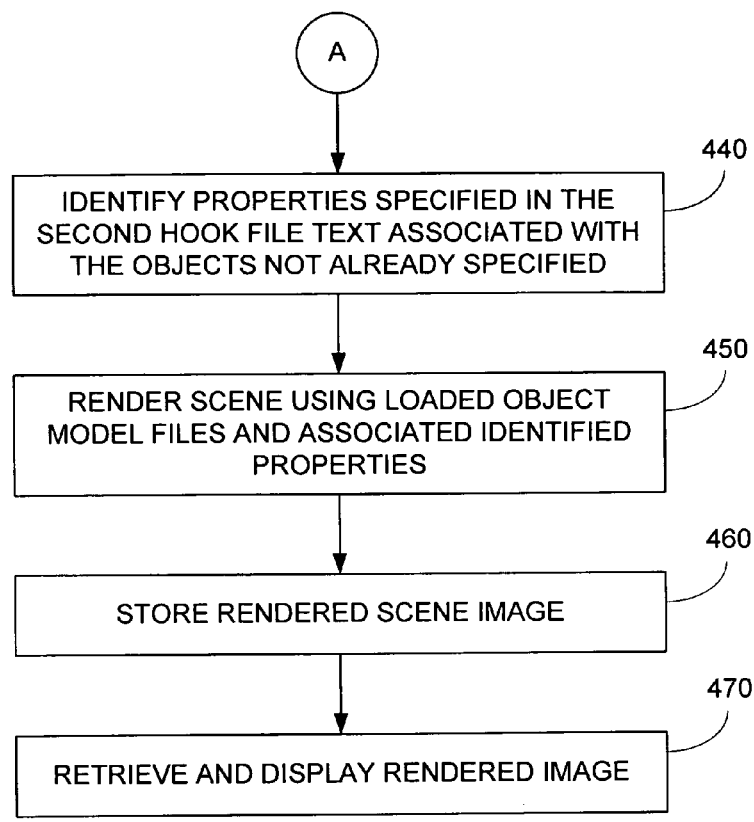

FIGS. 3A-B illustrate an different embodiment of the present invention. More specifically, FIGS. 3A-B illustrate the use of multiple hook files for specifying objects, and/or for providing properties to objects.

In this embodiment, multiple hook files may exist for each image in the feature. Thus instead of using only one hook file, a combination of hook files can provide the objects and the properties used for the objects. For example, in various embodiments, a hook file may exist for an entire feature, a hook file may exist for a "sequence" of shots in the feature, hook file may exist for particular "shot" (set of related scenes), and a hook file may exist for a particular scene. Accordingly, the process described in FIG. 2A may be repeated if there is another hook file associated with the scene, step 400.

Next, in one embodiment, the objects that are selected for rendering from the first hook file are then loaded into memory, step 410, and the objects that are selected for rendering from the second hook file are then loaded into memory, step 420.

In this embodiment, the properties (e.g. parameters, constants, attributes, and application data) specified in the first hook file and in the second hook file, and associated with each of the loaded objects are applied to the objects, step 430.

In the present embodiment, properties for an object specified in the second hook file may be different from properties for the object in the first hook file. In such a case, the properties of the object in the first hook file prevail. Accordingly, only properties of an object stored in the second hook file that are not specified by the first hook file are used for rendering purposes, step 440. An example of this can be seen in the following example:

```
a WHOLE FILM hook file includes:
    hook "mike" {full_model = "mike_full.mdl";
              param {number_of_legs =2;}}
a SEQUENCE 3 hook file includes:
    hook "mike" param {number_of_legs = 4;}
a SHOT hook file includes:
    hook "mike" param {skin_color = (0.3, 1, 0.4);}
```

First the shot hook file is processed according to the embodiment above, and the object "mike" is determined to be rendered. As can be seen, the skin color parameter is specified in the Shot hook file, thus this parameter is used. During the next iteration of the process above, for a second hook file, the sequence hook file is processed. From the sequence hook file, the additional parameter of number of legs is specified for "mike" to be four. Finally, during the next iteration of the process above, the whole film hook file is processed. From the whole film hook file, the object model is identified to be mike_full.mdl. Additionally, the number of legs is specified to be two. However, according to the present embodiment, the property of the sequence hook file "trumps" or overrides the specification for the whole film. Accordingly, after all parameters have been "resolved" to render "Mike", the model file mike_full.mdl is retrieved, with the number_of_legs parameter=4, and the skin_color (0.3, 1, 0.4).

In the present embodiment, the resolved object is rendered in an image, step 450; the image is stored, step 460, and the image is displayed, step 470.

The concepts described above have been successfully used and validated for Pixar's feature-length movies, including Finding Nemo™, Monsters, Inc.™ Toy Story 2™, and A Bugs Life™.

The techniques described above have used representations of objects that are found at "hard coded" computer locations, such as at specific computer disk directories, at specific network directories, with specific file names, or the like. However, the inventor of the present invention has recognized that this type of "hard coding" of object files has many disadvantages. Drawbacks include that it requires the user to understand the computer directory structure for objects. Further, it requires the user to know how different representations of objects are classified and stored within the directory structure. Other drawbacks include that as a directory structures changes, the animator who creates the scene descriptor file must constantly modify the scene descriptor file to stay current with such changes. Still other drawbacks include that over time, and with computer system migrations, or the like, the object directory structures may become corrupt, and objects may be lost. As a result, years after a scene is initially rendered, when the user attempts to re-render the scene, not all objects will be found. To address these drawbacks, the inventor has developed additional embodiments.

Figure 4:
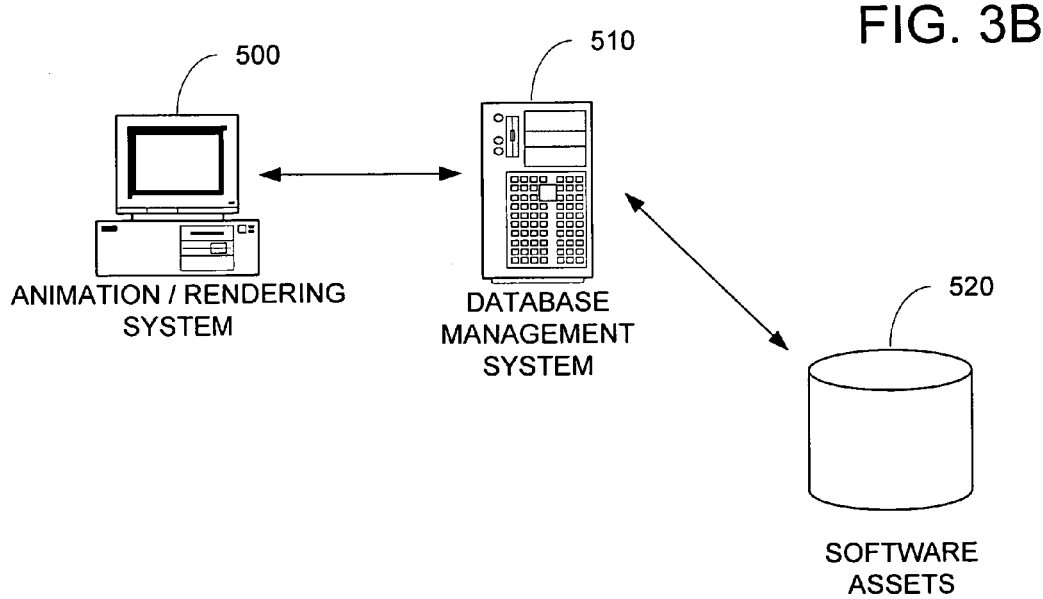
FIG. 4 illustrates another embodiment of the present invention.

FIG. 4 illustrates another embodiment of the present invention. More specifically, FIG. 4 illustrates an embodiment including a database. FIG. 4 includes a computer system 500, a database management system (dbms) 510, and a database 520. In the present embodiment, computer system 500 is a typical rendering system, described above in FIG. 1. Further, database management system 510 and database 520 may be a conventional database systems, available from Oracle, Sybase, or the like.

In the present embodiment, dbms 510 may include conventional database access mechanisms, such as an SQL query tool, or the like. In various embodiment, dbms 510 may include additional front-end software that provides organized access to database 520. In one example, the additional front-end software may include "asset management" software, i.e. software that enables users to more easily store and later retrieve software assets via a structured interface. In embodiments of the present invention, any conventional software asset management system may be adapted to be used.

In operation, computer system 500 may retrieve a scene descriptor file, similar to the above. In this embodiment, the scene descriptor file may simply specify an object name (asset name), specific search terms, a database query, or the like. For example, instead of specifying a filename within a directory, as shown above, the scene descriptor file may specify a series of key search terms to dbms 510. In response, in this example, dbms 510 may use the key search terms to query database 520 and return a directory location where the desired object representation may be found. In another example where an asset management system is implemented, the scene descriptor file may also provide the key search terms associated with the desired object. In response, the asset management system may access database 520, and return the desire object representation.

These examples demonstrate that these embodiments should greatly reduce the amount of work required to manage the scene descriptor file when object representations change or are updated, when new objects are added to the scene, or the like. Accordingly, the inventor believes that the advantages of these embodiments greatly enhance the value of embodiments of the present invention.

Figure 5:
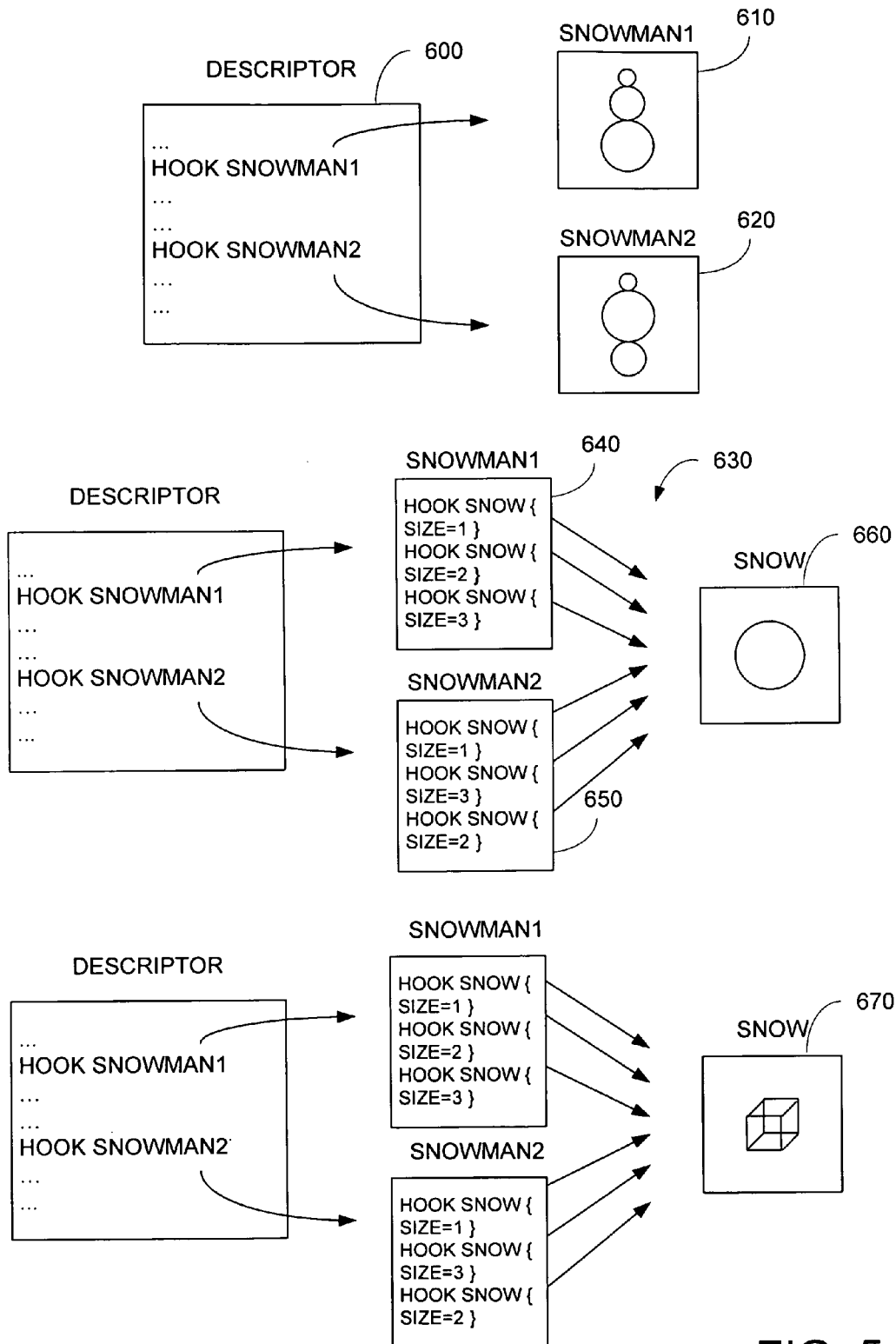
FIG. 5 illustrates an additional embodiment of the present invention.

FIG. 5 illustrates an additional embodiment of the present invention. In FIG. 5, 600 illustrates a scene descriptor file referencing a first "snowman" object 610, and a second "snowman" object 620, using the method initially described above. As illustrated, a first snowman object .mdl file and a second snowman mdl file are accessed when rendering these objects.

Also illustrated in FIG. 5, is 630 illustrating another embodiment of the present invention. 630 illustrates the concept of object "nuggets." In this embodiment, object models are decomposed into more primitive object models (nuggets). For example, first snowman object 640 and second snowman object 650 include repeated references to a "sphere" object 660. As can be seen, first snowman object 640 references sphere object 660 three times using different parameters, and second snowman object 650 references sphere object 660 three times using different parameters.

In embodiments of the present invention, it is contemplated that more than one level of object decomposition may be performed. For example, an object may be decomposed to a first set of objects, and these geometric objects may be decomposed into a second set of objects, and the like. It is contemplated, that this decomposition may be applied to light objects, camera objects, geometric objects, and the like. As is illustrated, the use of nuggets may greatly reduce the amount of redundant data stored and used to specify object representations in a scene.

In embodiments of the present invention, the nuggets concept also greatly increases the ease and ability for changes to be propagated for objects. For example, as illustrated in FIG. 5, if sphere object 660 is changed to a cube object 670, when retrieved in the scene, snowman object 680 and snowman object 690 are now made-up of cubes not spheres. Thus, as illustrated, a single change to a geometric primitive, is easily propagated through out the scene.

Another benefit to such embodiments is that a dependency analysis is performed on the fly, and nuggets are loaded into memory as necessary. For example, in the example in FIG. 5, when an animator wishes to include second snowman object 650 into a scene, because second snowman object 650 depends on sphere object 660, sphere object 660 is automatically loaded into memory.

Many changes or modifications are readily envisioned. In light of the above disclosure, one of ordinary skill in the art would recognize that the concept of object nuggets may be combined with the original embodiments, and the embodiments utilizing databases. Other combinations of embodiments are also contemplated.

In embodiments of the present invention, it is contemplated that a scene descriptor file can be used to render at least two representations of the scene. That is, it is contemplated that a scene descriptor file will have at least a full rendering option, and a rendering option that renders either less than all objects, or renders at least one object in an alternative representation. In one embodiment, a single scene descriptor text file may be used for the different rendering options desired. In various embodiments, any number of ways to define rendering options may be provided, for example, an animator may specify an option via a command-line switch option (e.g. -final, -light, -setdressing), via one or more check boxes in a graphical user interface, or the like. Further, any number of different purposes for rendering a scene, i.e. rendering options that can be imagined, for example, hard lighting, soft lighting, different camera angles for a scene, different textures, and the like.

It should be understood that "rendering" may refer to a high quality process of converting an image from a mathematical description of a scene using a program such as RenderMan®. Additionally, "rendering" may refer to any graphical visualization of the mathematical description of the scene, or any conversion of geometry to pixels, for example "rendering" with a lower quality rendering engine, or the like. Examples of low-quality rendering engines include GL and GPU hardware and software renderers, and the like.

The term "animator" may refer to an animator that "animates" objects in time. Additionally, the term "animator" may also refer to any user that specifies a scene for viewing, for whatever task. As examples, an animator may wish to view different representations of a scene for the scene layout purposes (a scene designer); to view character animation, facial animation, body animation (an animator); to view lighting (a lighting person); and the like.

Additionally, in some of the examples above, it was illustrated that alternative representations of objects may be selected and loaded into memory. However, it should be understood that in embodiments of the present invention, single representations of objects are contemplated, and that the single representations of objects may or may not be loaded. For example, one representation of a character object may be specified in the hook file, an animator may wish to only view the "scene design." Accordingly, the animator may not be interested in having the character object being included in the rendering, thus the character object is not loaded into memory.

Some embodiments of the present invention also allow an animator to work on "unloaded" objects. More specifically, in some embodiments, the hook file may specify parameters of objects that the animator may rely upon, without the objects being loaded into memory. For example, the hook file may specify a bounding box(es) of the object, so the animator can position objects around the unloaded object, without actually loading the object. In other examples, additional information may be provided, such as the position of the bounding box(es), the orientation of the bounding box(ex), color of the object, and the like. Such embodiments are believed to be beneficial by keeping as many objects unloaded as possible to speed the rendering process, while at the same time, providing information about the unloaded objects.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for rendering a frame of animation in a computer system having a computer memory, the method comprising:

retrieving scene descriptor data associated with the frame of animation, wherein the scene descriptor data includes a first specification of at least one object, the first specification being associated with a first user-defined purpose for rendering the frame of animation, wherein the scene descriptor data includes a second specification of the at least one object, the second specification being associated with a second user-defined purpose for rendering the frame of animation, and wherein the first and second specifications are separately derived;

receiving a selection of a first rendering option corresponding to the first user-defined purpose or a second rendering option corresponding to the second user-defined purpose;

querying a database external to the computer system for a first representation of the one object in response to the first specification of the object when the selection is of the first rendering option;

receiving the first representation of the object from the database external to the computer system when the selection is of the first rendering option;

loading the first representation of the object into the computer memory when the selection is of the first rendering option; and rendering the object for the frame of animation using the first representation of the object when the selection is of the first rendering option;

wherein the first representation of the object is not loaded into the computer memory when the selection is of the second rendering option.

2. The method of claim 1 further comprising:

querying the database external to the computer system for a second representation of the one object in response to the second specification of the object when the selection is of the second rendering option;

loading the second representation of the object into the computer memory when the selection is of the second rendering option; and rendering the object for the frame of animation using the second representation of the object when the selection is of the second rendering option;

wherein the second representation of the object is not loaded into the computer memory when the selection is of the first rendering option.

3. The method of claim 1
wherein the one object compnses a geometric object; and
wherein the first representation of the object comprises a geometric description of the geometric object.

4. The method of claim 1
wherein the one object compnses a camera object; and
wherein the first representation of the camera object comprises data selected from the group consisting of: camera field of view, camera position, camera orientation, camera aspect ratio.

5. The method of claim 1
wherein the one object comprises a light object; and
wherein the first representation of the light object comprises data selected from the group consisting of: type of light source, light color, light source, light quality, light shape.

6. The method of claim 1 wherein querying the database comprises:
providing to an asset management system the first specification of the object; and
receiving a location of the first representation of the one object from the asset management system.

7. The method of claim 1 further comprising:
storing the frame of animation; and
displaying the frame of animation.

8. A method for rendering a frame of animation in a computer system having a computer memory, the method comprising:
retrieving scene descriptor data associated with the frame of animation, wherein the scene descriptor data specifies at least one object, wherein the object is associated with a reference to a first representation of the object, the first representation of the object being associated with a first user-defined purpose for rendering the frame of animation, wherein the object is associated with a reference to a second representation of the object, the second representation of the object being associated with a second user-defined purpose for rendering the frame of animation, and wherein the first and second specifications are separately derived;

receiving a selection of a first rendering option corresponding to the first user-defined purpose or a second rendering option corresponding to the second user-defined purpose;

querying a database external to the computer system for the first representation of the object when the selection is of the first rendering option;

receiving the first representation of the object from the database external to the computer system when the selection is of the first rendering option;

loading the first representation of the object into the computer memory when the selection is of the first rendering option; and rendering the object for the frame of animation using the first representation of the object when the selection is of the first rendering option;

wherein the first representation of the object is not loaded into the computer memory when the selection is of the second rendering option;

wherein the first representation of the object comprises references to representations of a first plurality of objects;

wherein the second representation of the object comprises references to representations of a second plurality of objects; and wherein at least one object within the first plurality of objects is also within the second plurality of objects.

9. The method of claim 8 wherein loading the first representation of the object into the computer memory when the selection is of the first rendering option comprises loading representations of the first plurality of objects into the computer memory when the selection is of the first rendering option.

10. The method of claim 9 further comprises:
loading the second representation of the object into the computer memory when the selection is of the second rendering option; and
rendering the object for the frame of animation using the second representation of the object when the selection is of the second rendering option;
wherein the second representation of the object is not loaded into the computer memory when the selection is of the first rendering option.

11. The method of claim 9
wherein the one object comprises a geometric object; and
wherein the first representation of the object comprises a geometric description of the geometric object.

12. The method of claim 9
wherein the one object compnses a camera object; and
wherein the first representation of the camera object comprises data selected from the group consisting of: camera field of view, camera position, camera orientation, camera aspect ratio.

13. The method of claim 9
wherein the one object comprises a light object; and
wherein the first representation of the light object comprises data selected from the group consisting of: type of light source, light color, light source, light quality, light shape.

14. A computer program product for a computer system including a processor and a program memory, wherein the computer program product resides on a tangible medium, the computer program product comprising:

code that directs the processor to retrieve scene descriptor data associated with the frame of animation into the program memory, wherein the scene descriptor data specifies at least one object, wherein the object is associated with a first representation of the object, the first representation of the object being associated with a first user-defined purpose for rendering the frame of animation, wherein the object is associated with a second representation of the object, the second representation of the object being associated with a second user-defined purpose for rendering the frame of animation, and wherein the first and second specifications are separately derived;

code that directs the processor to determine a selection of a first rendering option corresponding to the first user-defined purpose or a second rendering option corresponding to the second user-defined purpose;

code that directs the processor to query a database external to the computer system for the first representation of the object when the selection is of the first rendering option;

code that directs the processor to receive the first representation of the object from the database external to the computer system when the selection is of the first rendering option;

code that directs the processor to load the first representation of the object into the program memory when the selection is of the first rendering option; and code that directs the processor to render the object for the frame of animation in response to the first representation of the object when the selection is of the first rendering option;

wherein the first representation of the object is not loaded into the program memory when the selection is of the second rendering option;

wherein the first representation of the object comprises references to representations of a first plurality of objects;

wherein the second representation of the object comprises references to representations of a second plurality of objects; and wherein at least one object within the first plurality of objects is also within the second plurality of objects.

15. The computer program product of claim 14 wherein code that directs the processor to load the first representation of the object into the program memory when the selection is of the first rendering option comprises code that directs the processor to load representations of the first plurality of objects into the program memory when the selection is of the first rendering option.

16. The computer program product of claim 15 further comprising code that directs the processor to load the second representation of the object into the program memory when the selection is of the second rendering option; and code that directs the processor to rendering the object for the frame of animation in response to the second representation of the object when the selection is of the second rendering option.

17. The computer program product of claim 16 wherein the object comprises a geometric object;

wherein the representations of the first plurality of objects comprise a plurality of geometric primitives.

18. The computer program product of claim 16 wherein the object comprises a camera object; and wherein the representations of the first plurality of objects includes properties selected from the group consisting of: camera field of view, camera position, camera orientation, aspect ratio.

19. The computer program product of claim 16 wherein the object comprises a light object; and wherein the representations of the first plurality of object includes properties selected from the group: type of light source, light color, light source, light quality, light shape.

20. The computer program product of claim 16 wherein the first representation of the object further comprises values for properties of objects in the first plurality of objects.

21. The method of claim 3 wherein the geometric description of the geometric object includes a plurality of geometric parameters; and wherein the scene descriptor data includes values for the plurality of geometric parameters.

22. The method of claim 4 wherein the first representation of the camera object includes a plurality of camera parameters; and wherein the scene descriptor data includes values for the plurality of camera parameters.

23. The method of claim 5 wherein the first representation of the light object includes a plurality of light parameters; and wherein the scene descriptor data includes values for the plurality of light parameters.

* * * * *